(12) United States Patent
Kim et al.

(10) Patent No.: US 8,623,537 B2
(45) Date of Patent: Jan. 7, 2014

(54) RECHARGEABLE BATTERY AND BATTERY MODULE

(75) Inventors: Jun-Sik Kim, Yongin-si (KR); Sung-Soo Kim, Yongin-si (KR); Nam-soon Choi, Yongin-si (KR); Jeong-Soon Shin, Yongin-si (KR); Tae-Keun Kim, Yongin-si (KR); Sae-Weon Roh, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 358 days.

(21) Appl. No.: 12/645,312

(22) Filed: Dec. 22, 2009

(65) Prior Publication Data

US 2011/0045333 A1 Feb. 24, 2011

Related U.S. Application Data

(60) Provisional application No. 61/234,893, filed on Aug. 18, 2009.

(51) Int. Cl.
*H01M 10/50* (2006.01)
*H01M 2/02* (2006.01)
*H01M 2/30* (2006.01)
*H01M 10/04* (2006.01)

(52) U.S. Cl.
USPC .......................................... 429/120; 429/162

(58) Field of Classification Search
USPC .................................. 429/120, 162
See application file for complete search history.

(56) References Cited

U.S. PATENT DOCUMENTS

| | | |
|---|---|---|
| 5,510,207 A | 4/1996 | Grivel et al. |
| 6,387,566 B1 | 5/2002 | Chang et al. |
| 7,736,795 B2 | 6/2010 | Sakamoto et al. |
| 7,790,311 B2 | 9/2010 | Cho |
| 8,173,293 B2 | 5/2012 | Kim |
| 2007/0002523 A1* | 1/2007 | Ando et al. ................... 361/503 |
| 2007/0059593 A1* | 3/2007 | Kim et al. ..................... 429/162 |

(Continued)

FOREIGN PATENT DOCUMENTS

| | | |
|---|---|---|
| CN | 1713438 A | 12/2005 |
| CN | 201051525 Y | 4/2008 |

(Continued)

OTHER PUBLICATIONS

Communication pursuant to Article 94(3) EPC dated Oct. 26, 2011 for corresponding EP Application No. 09 181 035.8-2119.

(Continued)

*Primary Examiner* — Gregg Cantelmo
(74) *Attorney, Agent, or Firm* — Knobbe, Martens, Olson & Bear, LLP

(57) ABSTRACT

A rechargeable battery that can improve heat dissipating characteristics is provided. The rechargeable battery includes: an electrode group including a positive electrode; an electrode group that has at least one terminal; a case that defines a recess that receives the electrode group wherein the case includes an opening that provides access to the recess; a film cover that extends over the opening so as to secure the electrode group within the recess of the case; and a heat dissipating member positioned on the case so as extend outward from the case to dissipate heat from the recess containing the electrode group. Multiple batteries can be assembled into modules where the batteries are stacked so that the film covers are protected from external impact.

15 Claims, 10 Drawing Sheets

(56) References Cited

U.S. PATENT DOCUMENTS

| | | | |
|---|---|---|---|
| 2007/0154794 A1* | 7/2007 | Kim et al. | 429/162 |
| 2007/0264535 A1* | 11/2007 | Lee et al. | 429/7 |
| 2008/0241680 A1* | 10/2008 | Lee et al. | 429/185 |
| 2009/0142660 A1 | 6/2009 | Hori et al. | |
| 2010/0273040 A1 | 10/2010 | Kubota et al. | |
| 2010/0276120 A1 | 11/2010 | Takagi | |
| 2011/0008665 A1 | 1/2011 | Yoon et al. | |

FOREIGN PATENT DOCUMENTS

| | | | |
|---|---|---|---|
| EP | 2 020 695 A2 | | 2/2009 |
| JP | 04-073870 | | 3/1992 |
| JP | 2000-299101 A | | 10/2000 |
| JP | 2004-071179 | | 3/2004 |
| JP | 2005-203192 | | 7/2005 |
| JP | 2006-244783 | | 9/2006 |
| JP | 2006252802 A | * | 9/2006 |
| JP | 2007220544 A | * | 8/2007 |
| JP | 2007-242320 A | | 9/2007 |
| JP | 2009-26735 | | 2/2009 |
| JP | 2009-037815 A | | 2/2009 |
| JP | 2009-146881 | | 7/2009 |
| JP | 2009-170369 | | 7/2009 |
| KR | 10-2008-0042965 | * | 5/2008 |
| KR | 10-2009-0047924 | | 5/2009 |
| WO | WO 2007114310 A1 | * | 10/2007 |
| WO | WO 2008016243 A1 | * | 2/2008 |
| WO | WO 2009/018940 | | 2/2009 |
| WO | WO 2009/061088 A1 | | 5/2009 |

OTHER PUBLICATIONS

EP Search dated Dec. 10, 2010 from corresponding EP Application No. 0918035.8.

Allowed Patent KR 10-1117625 dated Feb. 10, 2012 for corresponding KR Application 10-2009-0132202.

Office Action dated Jul. 16, 2013 for corresponding JP Application No. 2010-170222.

Office Action dated Jan. 16, 2013 for corresponding CN Application No. 201010258957.8.

Communication from EPO dated Jan. 30, 2013 for corresponding EP Application No. 09 181 035.8-2119.

* cited by examiner

RECHARGEABLE BATTERY AND BATTERY MODULE

CROSS-REFERENCE TO RELATED APPLICATION

This application claims priority to and the benefit of Provisional Patent Application No. 61/234,893 filed on Aug. 18, 2009 in the U.S. Patent and Trademark Office, the entire contents of which are incorporated herein by reference.

BACKGROUND

1. Field

The described technology relates generally to a rechargeable battery and a battery module. More particularly, the described technology relates generally to a rechargeable battery and a battery module having a case with an improved structure.

2. Description of the Related Technology

A rechargeable battery can be recharged and discharged, in contrast to a primary battery that cannot be recharged. A low capacity rechargeable battery is generally used as a power source for a small portable electronic device, such as a mobile phone, a laptop computer, and a camcorder, etc., and a large capacity rechargeable battery is generally used as a power source for driving a motor such as for a hybrid vehicle.

A large capacity high power rechargeable battery with high energy density using a non-aqueous electrolyte has been developed, and the rechargeable battery is generally formed with a large capacity high power rechargeable battery module by coupling a plurality of rechargeable batteries in series or in parallel in order to use it to drive a device, for example, a motor such as an electric vehicle requiring a large amount of electric power.

Further, a high power rechargeable battery is generally formed with a plurality of rechargeable batteries that are coupled in series or in parallel, and the rechargeable battery may be formed in a cylindrical shape or a square shape.

A conventional rechargeable battery includes an electrode group in which a positive electrode and a negative electrode are positioned with a separator interposed therebetween, a metal can having a space that houses the electrode group, a cap plate that closes and seals the metal can and in which a terminal hole that has a terminal inserted therein is formed, and a terminal that is electrically connected to the electrode group and that is inserted into the terminal hole to protrude to the outside of a case.

A lithium ion battery among existing rechargeable batteries is used as a small mobile terminal battery, uses a small metal can or a film type pouch sheath material, and has a secure sealing structure through welding or fusing in order to isolate the outside from the inside of the battery.

However, a pouch type battery is weak with respect to external impact and cannot easily discharge heat. Further, because the pouch type battery has no structure that fixes its external shape, it is difficult to manufacture the pouch type batteries with a battery module by stacking.

A metal can type battery has high strength, but has a heavy weight and has a difficulty in discharging internal heat to the outside.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery and a battery module improving output per unit weight and improving heat dissipating characteristics.

An embodiment of the present invention provides a rechargeable battery including: an electrode group including positive electrodes, negative electrodes, and separators that are disposed between the positive electrodes and the negative electrodes; a mounting recess that houses the electrode group; a case that has a heat dissipating flange formed at an upper end of the mounting recess; and a film cover that is installed at the upper end of the mounting recess to seal the mounting recess.

A bent heat dissipating plate may be formed in the heat dissipating flange, and a terminal recess in which a terminal that is electrically connected to the electrode group is inserted may be formed in the heat dissipating flange.

An insulation layer that encloses a circumference of the terminal may be formed in the terminal, the insulation layer may be inserted into the terminal recess, and a sealing layer to which the film cover is attached may be formed in the heat dissipating flange.

The sealing layer may be patterned in a check pattern or a stripe pattern, a positive terminal may be electrically connected to a positive electrode of the electrode group, a negative terminal may be electrically connected to a negative electrode of the electrode group, and the positive terminal or the negative terminal may be attached to an inner surface of the mounting recess.

An insulation film may be coated on an inner surface of the case, and the film cover may include a metal foil and a polymer layer that is disposed at both surfaces of the metal foil.

The case may include a bottom heat dissipating portion that is formed in the bottom of the mounting recess, and a cooling flow path that circulates a coolant may be formed within the bottom heat dissipating portion. A protruding heat dissipating fin may be formed in an external wall surface of the mounting recess, and the protruding heat dissipating fin may be formed in the heat dissipating flange.

Another embodiment of the present invention provides a battery module including: an electrode group including positive electrodes, negative electrodes, and separators that are disposed between the positive electrodes and the negative electrodes; a mounting recess that houses the electrode group, a case that has a heat dissipating flange that is formed at an upper end of the mounting recess; a plurality of rechargeable batteries including a film cover that is installed at an upper end of the mounting recess to seal the mounting recess; and a fixing member that puts pressure on the rechargeable batteries.

A hollow spacer that receives a fixing member may be installed between heat dissipating flanges of neighboring rechargeable batteries, and the rechargeable battery may be disposed to contact the film cover with a rechargeable battery of one side and to contact the bottom of the mounting recess with a rechargeable battery of the other side.

The rechargeable battery may include a positive terminal that is electrically connected to a positive electrode of the electrode group and a negative terminal that is electrically connected to a negative terminal of the electrode group, the positive terminal may be opposite to a positive terminal of a neighboring rechargeable battery, the negative terminal may be opposite to a negative terminal of a neighboring rechargeable battery, the positive terminal may be welded to a positive terminal of a neighboring rechargeable battery, and the negative terminal may be welded to a negative terminal of a neighboring rechargeable battery.

The rechargeable battery may include a positive terminal that is electrically connected to a positive electrode of the electrode assembly and a negative terminal that is electrically connected to a negative electrode of the electrode assembly, and at one side thereof, the positive terminal and a negative terminal of a neighboring rechargeable battery may be bonded by welding, and at the other side thereof, the negative terminal and a positive terminal of a neighboring rechargeable battery may be bonded by welding.

The case may include a bottom heat dissipating portion that is formed in the bottom of the mounting recess, and a cooling flow path that circulates a coolant may be formed within the bottom heat dissipating portion.

According to an embodiment of the present invention, heat dissipating characteristics of a rechargeable battery are improved and output per unit weight thereof is improved. Further, a battery module is easily fastened and assembled.

DETAILED DESCRIPTION

Figure 1:
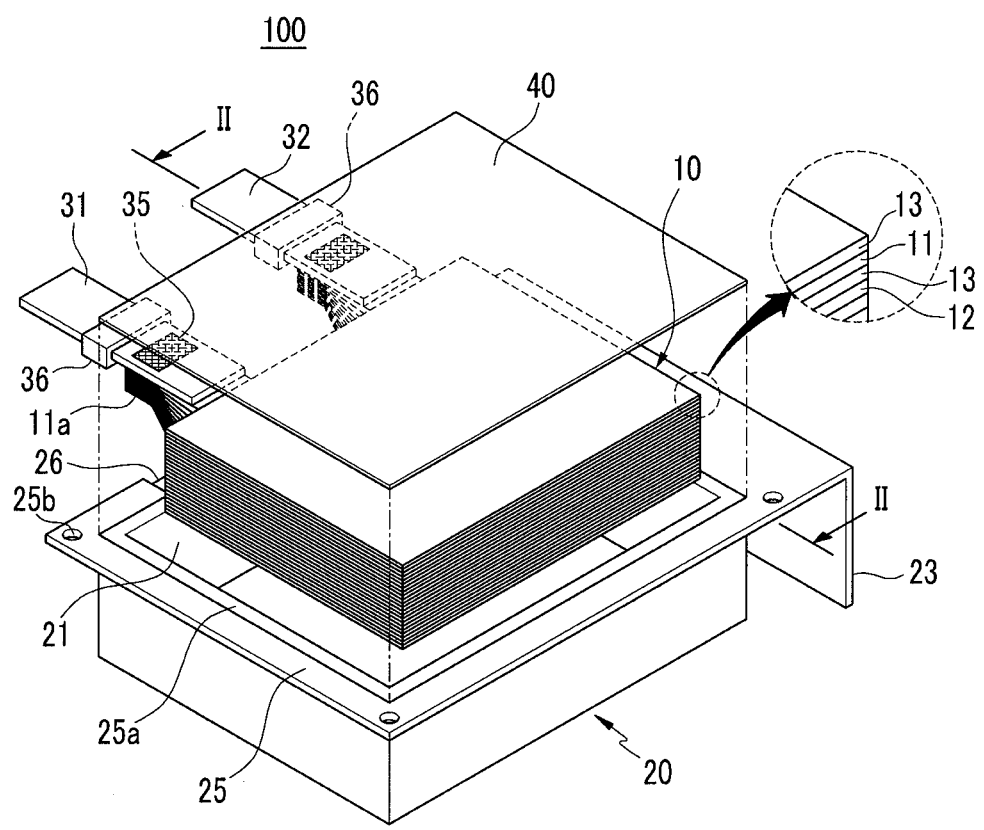
FIG. 1 is a perspective view illustrating a rechargeable battery according to a first embodiment of the present invention.

Embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention. In the specification and drawings, like reference numerals designate like elements.

Figure 2:
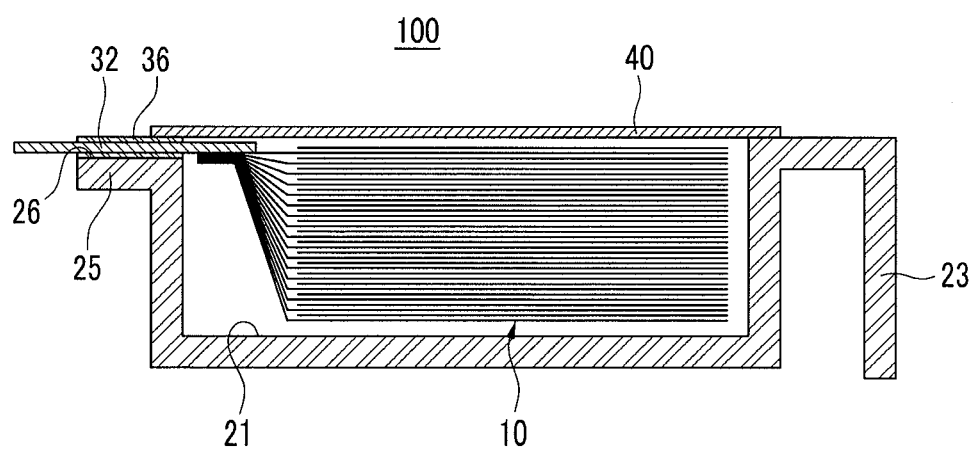
FIG. 2 is a cross-sectional view of the rechargeable battery taken along line II-II of FIG. 1.

FIG. 1 is a perspective view illustrating a rechargeable battery according to a first embodiment of the present invention, and FIG. 2 is a cross-sectional view of the rechargeable battery taken along line II-II of FIG. 1.

Referring to FIGS. 1 and 2, a rechargeable battery 100 according to the illustrated embodiment includes an electrode assembly 10 in which separators 13 may be interposed between positive electrodes 11 and negative electrodes 12, a case 20 that houses the electrode assembly 10, a positive electrode terminal 31 and a negative electrode terminal 32 that are electrically connected to the electrode assembly 10, and a film cover 40 that seals the case 20. As an example of the rechargeable battery 100 according to the illustrated embodiment, a lithium-ion rechargeable battery is described.

The positive electrode 11 may be formed in a structure in which a positive active material is coated on a positive current collector, and the negative electrode 12 formed in a structure in which a negative active material is coated on a negative current collector. The electrode assembly 10 may be formed in a structure in which a plurality of positive electrodes 11 and negative electrodes 12 are alternately stacked with the separators 13 interposed therebetween.

However, embodiments of the present invention are not limited thereto, and the electrode assembly 10 may be formed in a structure of interposing the separators 13 between the positive electrodes 11 and the negative electrodes 12 of a belt shape and spiral-winding them.

In the stacked electrode assembly 10, a positive uncoated region and a negative uncoated region may be positioned at one side end thereof, the positive electrode terminal 31 may be attached to the positive uncoated region by welding, and the negative electrode terminal 32 may be attached to the negative uncoated region by welding. In the positive electrode terminal 31 and the negative electrode terminal 32, an insulation layer 36 for insulation from the case 20 may be formed to enclose a circumference of the terminals 31 and 32.

The case 20 can include a mounting recess 21 that houses the electrode assembly 10, and a heat dissipating flange 25 that is extended to the outside from an upper end of the mounting recess 21. The mounting recess 21 may have an approximately quadrangular shape, and be disposed at the center of the case 20. The case 20 may be formed with a plate shape, and the mounting recess 21 may be formed by bending a plate-shaped case. The case may include aluminum, stainless steel, nickel, or an alloy thereof.

The heat dissipating flange 25 may be formed along a circumference of the mounting recess 21, and a fastening hole 25b may be formed at the corner of the heat dissipating flange 25. A terminal recess 26 in which the terminals 31 and 32 are inserted may be formed in the heat dissipating flange 25, and the terminal recess 26 may be formed from an external end portion of the heat dissipating flange 25 to the mounting recess 21. The insulation layer 36 may be inserted into the terminal recess 26 to seal between the case 20 and the film cover 40.

Further, in the heat dissipating flange 25, a sealing portion 25a that attaches the film cover 40 may be formed in a portion contacting with the mounting recess 21.

Figure 3A:
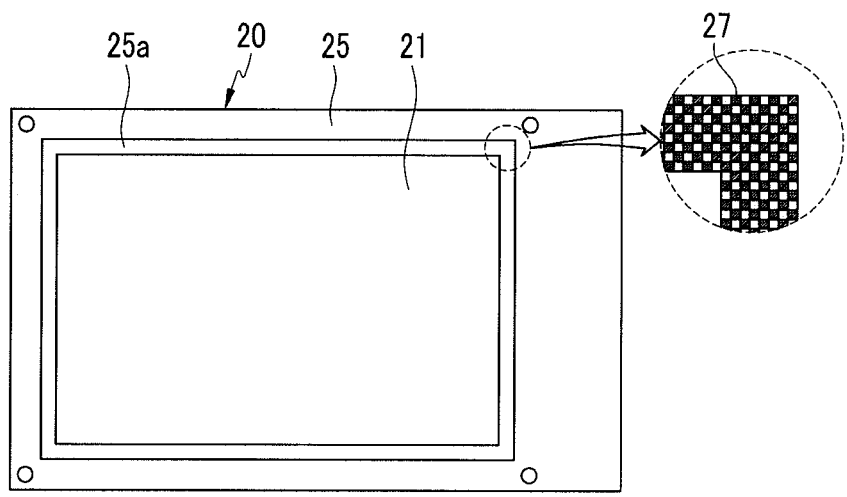
FIG. 3A is a top plan view illustrating a case according to a first embodiment of the present invention.
Figure 3B:
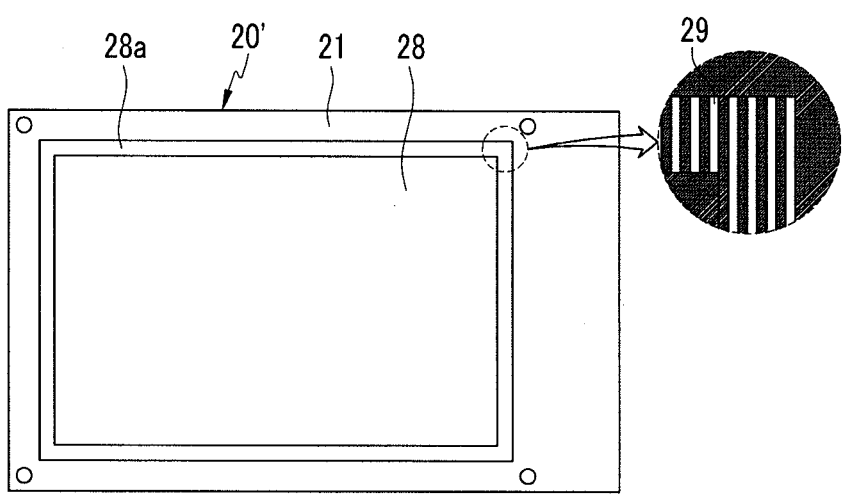
FIG. 3B is a top plan view illustrating a modified example of a case according to a first embodiment of the present invention.

As shown in FIG. 3A, in the sealing portion 25a, an adhesive 27 may be patterned in a check form and coated. Further, as shown in FIG. 3B, in a sealing portion 28a that is formed in a heat dissipating flange 28 of a case 20', the adhesive 29 may be patterned in a stripe form. When the sealing portions 25a and 28a are patterned in a check form or a stripe form, the film cover 40 more closely contacts with the sealing portions 25a and 28a to stably seal the mounting recess 21.

The film cover 40 may be bonded to the sealing portion 25a, be formed in an approximately quadrangular shape, and may cover entirely an opening of the mounting recess 21. Accordingly, the mounting recess 21 entirely sealed by the film cover 40. The film cover 40 may be made of a polymer, or be formed in a structure in which a polymer is coated on both surfaces of a metal foil.

A bent heat dissipating plate 23 entirely formed at one end of the heat dissipating flange 25. The heat dissipating plate 23 may be bent toward a bottom direction of the mounting recess 21, and be formed at a position that is separated from the mounting recess 21.

Accordingly, by discharging a heat through the heat dissipating plate 23, the case 20 can be efficiently cooled. The heat dissipating plate 23 can be formed integrally with the heat dissipating flange 25, and heat that is generated within the case 20 can be rapidly discharged through the heat dissipating flange 25 and the heat dissipating plate 23.

Figure 4:
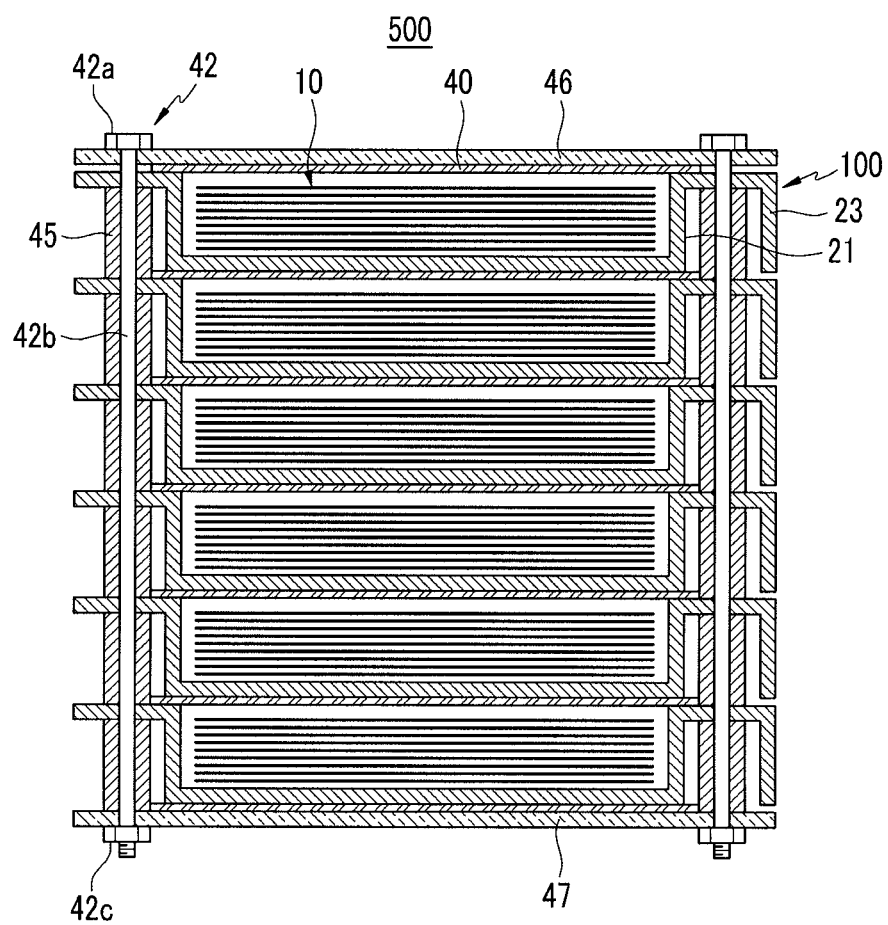
FIG. 4 is a cross-sectional view illustrating a battery module according to a first embodiment of the present invention.

FIG. 4 is a cross-sectional view illustrating a battery module according to a first embodiment of the present invention.

Referring to FIG. 4, a battery module 500 according to the first illustrated embodiment includes a plurality of stacked rechargeable batteries 100, end plates 46 and 47 that are installed at the outermost sides of the rechargeable batteries 100, and a fixing member 42 that penetrates through and is fastened to the end plates 46 and 47 and the case 20 of the rechargeable batteries 100.

The rechargeable batteries 100 may be stacked so that the bottom of the mounting recess 21 contacts with a heat dissipating flange 25 of a neighboring rechargeable battery 100, and the bottom of a neighboring rechargeable battery 100 is positioned on a film cover 40. Accordingly, the film cover 40 can be safely protected from an external impact. Further, walls of the mounting recess 21 may be arranged in a line in order to support a load that is transferred through a neighboring case 20.

A fixing member 42 may be inserted into a fastening hole 25b that is formed in the heat dissipating flange 25, and the fixing member 42 may penetrate through and be fastened to the end plates 46 and 47 and the heat dissipating flange 25.

The fixing member 42 may include a connecting bar 42b in which a head portion 42a is formed at one side thereof and a nut 42c that is fastened to the connecting bar 42b. The fixing member 42 may be integrally fixed by putting pressure on the cases 20.

A spacer 45 may be installed between the heat dissipating flanges 25 of neighboring rechargeable batteries 100, and formed with a hollow shape in order to insert the fixing member 42 therein.

The end plates 46 and 47 may be installed in an upper part and a lower part of the battery module 100, respectively, the end plate 47 that is installed at one side thereof can closely contacts the bottom of the case 20, and the end plate 46 that is installed at the other side thereof can cover the film cover 40.

According to the present illustrated embodiment, by stacking the cases 20, the battery module 500 can be easily manufactured, and when an error occurs in some rechargeable battery 100, the rechargeable battery 100 can be easily replaced and repaired. Further, heat can be easily discharged through the heat dissipating flange 25 that is formed in the cases 20.

Figure 5:
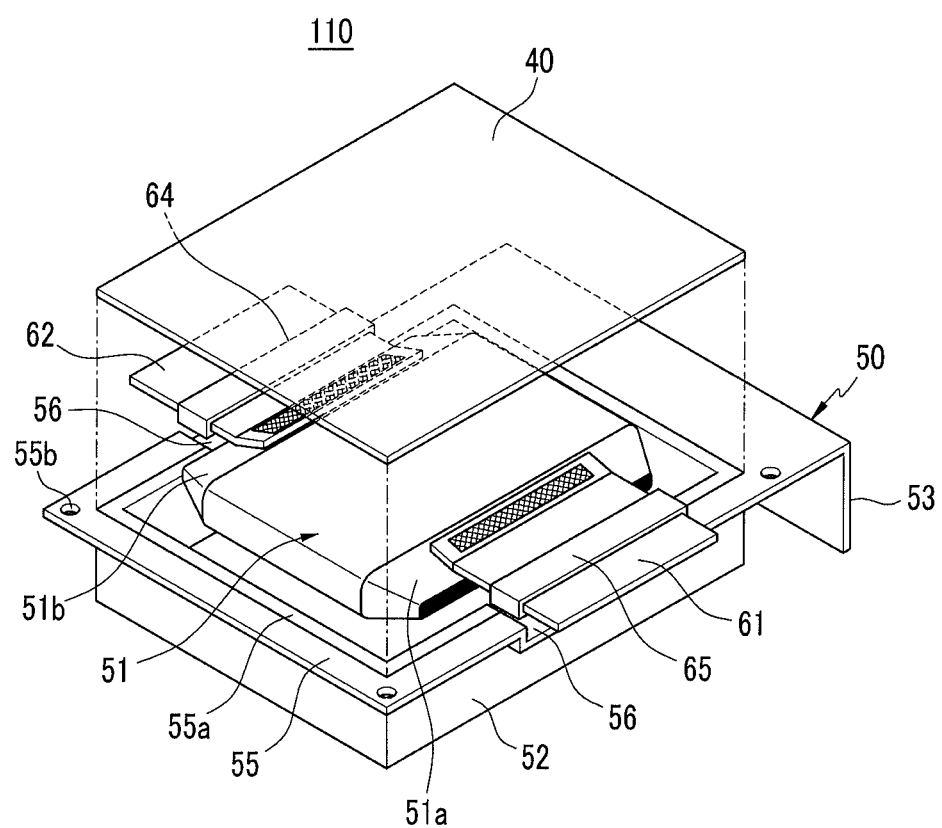
FIG. 5 is an exploded perspective view illustrating a rechargeable battery according to a second embodiment of the present invention.

FIG. 5 is an exploded perspective view illustrating a rechargeable battery according to a second embodiment of the present invention.

Referring to FIG. 5, a rechargeable battery 110 according to the present illustrated embodiment includes an electrode assembly 51 in which separators are interposed between positive electrodes 51a and negative electrodes 51b, a case 50 that houses the electrode assembly 51, a positive electrode terminal 61 and a negative electrode terminal 62 that are electrically connected to the electrode assembly 51, and a film cover 40 that seals the case 50.

The electrode assembly 51 may be formed by interposing a separator between the positive electrode 51a and the negative electrode 51b of a belt shape, and spiral-winding them. In the spiral-wound electrode assembly 51, a positive uncoated region may be formed at one side end thereof and a negative uncoated region formed at the other side end thereof. In the electrode assembly 51, the positive electrode terminal 61 may be attached to the positive uncoated region by welding, and the negative electrode terminal 62 attached to the negative uncoated region by welding. Accordingly, the positive electrode terminal 61 and the negative electrode terminal 62 can protrude in opposite directions.

In the positive electrode terminal 61 and the negative electrode terminal 62, insulation layers 64 and 65 for insulation from the case 50 may be formed to enclose circumferences of the terminals 61 and 62.

The case 50 can include a mounting recess 52 that houses the electrode assembly 51, and a heat dissipating flange 55 that is extended to the outside from an upper end of the mounting assembly 52. The mounting assembly 52 may have an approximately quadrangular shape and be disposed at the center of the case 50.

The heat dissipating flange 55 may be formed along a circumference of the mounting assembly 52, and a fastening hole 55b formed at the corner of the heat dissipating flange 55. A terminal recess 56 in which the terminals 61 and 62 are inserted may be formed in the heat dissipating flange 55, and the terminal recess 56 formed from an external end portion of the heat dissipating flange 55 to the mounting recess 52. An insulation layer 65 may be inserted into the terminal recess 56 to seal between the case 50 and the film cover 40.

Further, a sealing portion 55a may be formed in the heat dissipating flange 55 so that the film cover 40 may be attached to a portion contacting the mounting recess 52. A bent heat dissipating plate 53 may be formed at one end of the heat dissipating flange 55. The heat dissipating plate 53 may be bent in a bottom direction of the mounting recess 52 from the heat dissipating flange 55, and formed at a position that is separated from the mounting recess 52.

A coolant may be supplied to a space between the heat dissipating plate 53 and the mounting recess 52 to efficiently cool the case 50. The heat dissipating plate 53 may be integrally formed with the heat dissipating flange 55, and heat that is generated within the case 50 can be rapidly discharged through the heat dissipating flange 55 and the heat dissipating plate 53.

Figure 6:
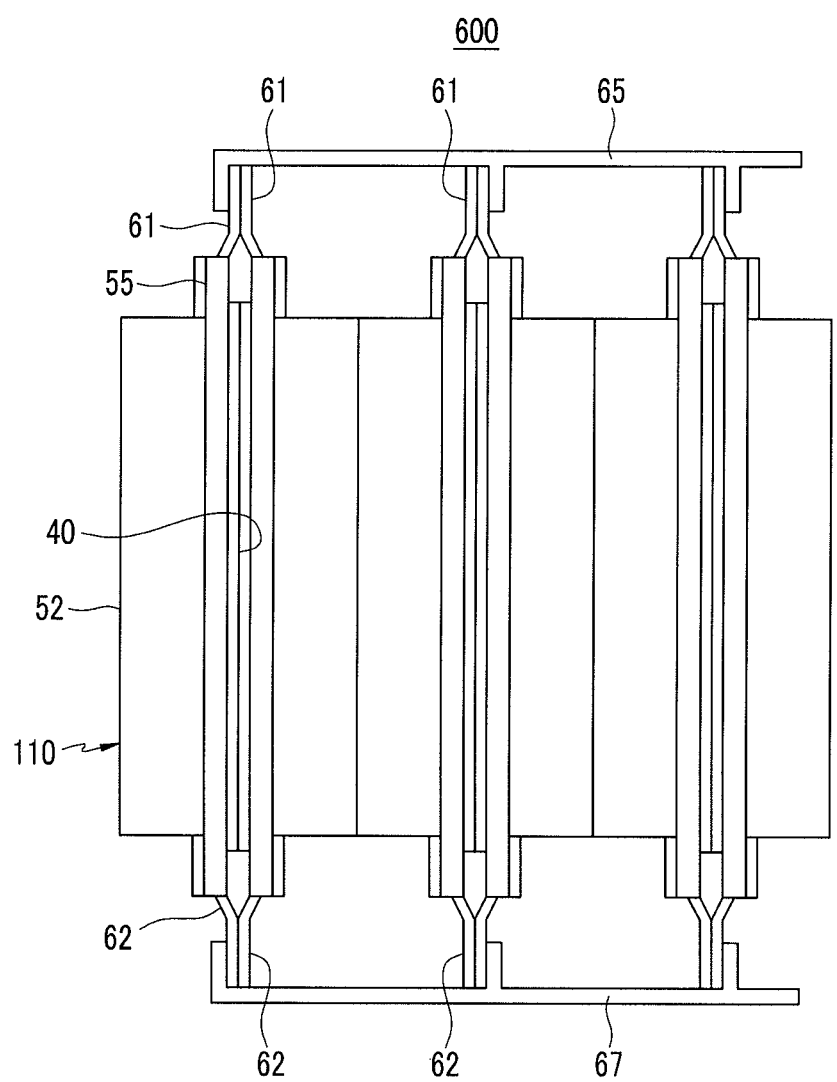
FIG. 6 is a side view illustrating a battery module according to a second embodiment of the present invention.

FIG. 6 is a side view illustrating a battery module 600 according to a second embodiment of the present invention.

Referring to FIG. 6, a battery module 600 according to the present illustrated embodiment includes a plurality of rechargeable batteries 110 and connection members 65 and 67 that electrically connect the rechargeable batteries 110.

One rechargeable battery 110 may be disposed to contact via a film cover 40 with a rechargeable battery 110 of one side and to contact in the bottom of a mounting recess 52 with a rechargeable battery 110 of the other side. Accordingly, because the film cover 40 is disposed between the heat dissipating flanges 55, the film cover 40 can be prevented from being damaged by an external impact. In this case, a positive electrode terminal 61 is opposite to a positive electrode terminal 61 of a neighboring rechargeable battery 110, and a negative electrode terminal 62 is opposite to a negative electrode terminal 62 of a neighboring rechargeable battery 110.

The positive electrode terminal 61 may be welded to the negative electrode terminal 62 of a neighboring rechargeable battery 110 and the negative electrode terminal 62 may be welded to the negative electrode terminal 62 of a neighboring rechargeable battery 110, and thus two rechargeable batteries 110 may be coupled in parallel. The connection members 65 and 67 can electrically connect two rechargeable batteries 110, and in the present illustrated embodiment, the rechargeable batteries 110 are coupled in parallel. According to the present illustrated embodiment, by electrically connecting a plurality of small rechargeable batteries 110, a large capacity battery module can be formed and structural stability of the battery module and an output to weight ratio thereof can be improved.

However, embodiments of the present invention are not limited thereto, and the connection members 65 and 67 may connect six rechargeable batteries 110 with a 2P3S structure by coupling two rechargeable batteries 110 in series.

Figure 7:
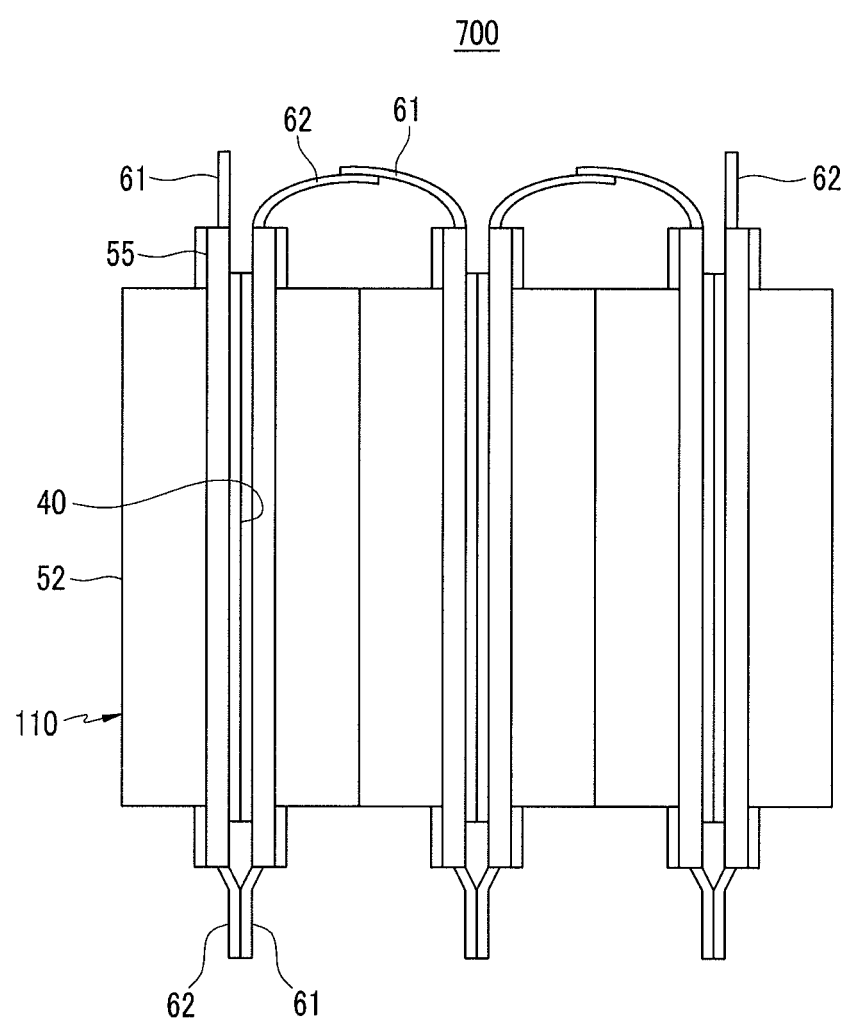
FIG. 7 is a side view illustrating a battery module according to a third embodiment of the present invention.

FIG. 7 is a side view illustrating a battery module 700 according to a third embodiment of the present invention.

Referring to FIG. 7, a rechargeable battery 110 according to the present illustrated embodiment is formed in the same structure as that of the rechargeable battery 110 according to the second described embodiment, and therefore a detailed description thereof will not be presented.

One rechargeable battery 110 may be disposed to contact via a film cover 40 with a rechargeable battery 110 of one side and to contact in the bottom of a mounting recess 52 with a rechargeable battery 110 of the other side. In this case, a positive electrode terminal 61 is opposite to a negative electrode terminal 62 of a neighboring rechargeable battery 110, and a negative electrode terminal 62 is opposite to a positive electrode terminal 61 of a neighboring rechargeable battery 110.

At one side, adjacent positive and negative electrode terminals 61 and 62 may be bonded by welding, and at the other side, distant negative and positive electrode terminals 62 and 61 may be bonded by welding. Accordingly, the rechargeable batteries 110 can be coupled in series without interposing a separate member.

Figure 8:
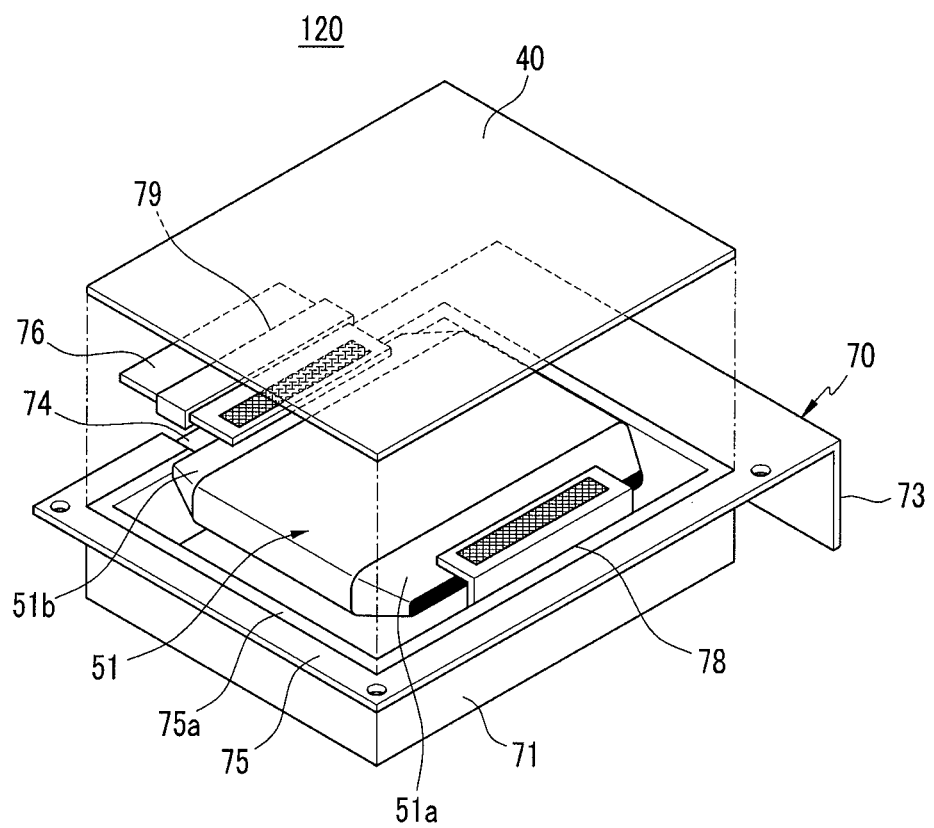
FIG. 8 is an exploded perspective view illustrating a rechargeable battery according to a fourth embodiment of the present invention.

FIG. 8 is an exploded perspective view illustrating a rechargeable battery according to a fourth embodiment of the present invention.

Referring to FIG. 8, a rechargeable battery 120 according to the present illustrated embodiment includes an electrode assembly 51 in which a separator is interposed between a positive electrode 51a and a negative electrode 51b, a case 70 that houses the electrode assembly 51, a positive electrode terminal 76 and negative electrode terminal 78 that are electrically connected to the electrode assembly 51, and a film cover 40 that seals the case 70.

The electrode assembly 51 according to the present embodiment may be formed in the same structure as that of the electrode assembly according to the second embodiment, and therefore a detailed description thereof will not be presented.

The case 70 can include a mounting recess 71 that houses the electrode assembly 51, and a heat dissipating flange 75 that is extended to the outside from an upper end of the mounting recess 71. The mounting recess 71 may have an approximately quadrangular shape, and is disposed at the center of the case 70.

In the electrode assembly 51, the positive electrode terminal 76 may be attached to the positive electrode 51a thereof by welding, and the negative electrode terminal 78 may be attached to the negative electrode 51b thereof by welding. Accordingly, the positive electrode terminal 76 and the negative electrode terminal 78 can protrude in opposite directions.

In the positive electrode terminal 76, an insulation layer 79 for insulation from the case 70 may be formed to enclose a circumference of the positive electrode terminal 76. The negative electrode terminal 78 may be bent toward the bottom of the mounting recess 71 and attached to an inner wall surface of the mounting recess 71 by welding. Accordingly, the case 70 can have negative polarity. Therefore, the rechargeable batteries 120 can be stacked, and the rechargeable batteries 120 can be easily coupled in series by simply attaching the positive electrode terminal 76 to a case 70 of a neighboring rechargeable battery 120 by welding.

The heat dissipating flange 75 may be formed along a circumference of the mounting recess 71, and a fastening hole 75b may be formed at the corner of the heat dissipating flange 75. A terminal recess 74 in which the positive electrode terminal 76 may be inserted may be formed in the heat dissipating flange 75, and the insulation layer 79 may be inserted into the terminal recess 74 to seal between the case 70 and the film cover 40.

Further, a sealing portion 75a may be formed in the heat dissipating flange 75 so that the film cover 40 may be attached to a portion contacting the mounting recess 71. A bent heat dissipating plate 73 may be formed at one end of the heat dissipating flange 75. The heat dissipating plate 73 may be bent in a bottom direction of the mounting recess 71 from the heat dissipating flange 75, and formed at a position that is separated from the mounting recess 71.

Figure 9:
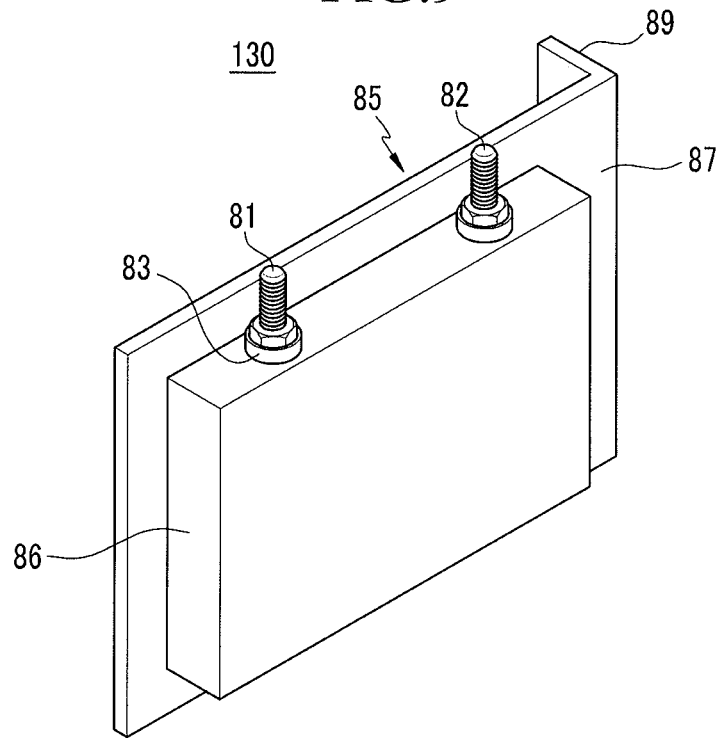
FIG. 9 is a perspective view illustrating a rechargeable battery according to a fifth embodiment of the present invention.
Figure 10:
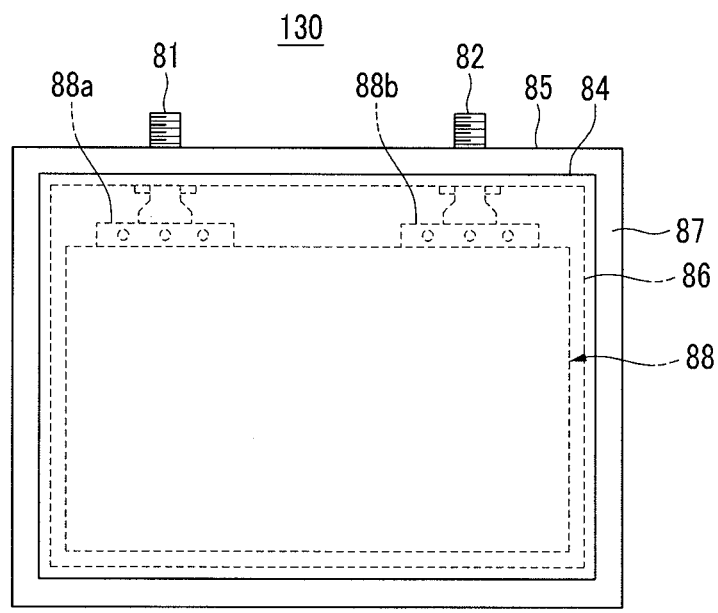
FIG. 10 is a rear view illustrating a rechargeable battery according to a fifth embodiment of the present invention.

FIG. 9 is a perspective view illustrating a rechargeable battery according to a fifth embodiment of the present invention, and FIG. 10 is a rear view illustrating a rechargeable battery according to the fifth illustrated embodiment of the present invention.

Referring to FIGS. 9 and 10, a rechargeable battery 130 according to the present illustrated embodiment includes a case 85, an electrode assembly 88 that is inserted into the case 85, a positive electrode terminal 81 and negative electrode terminal 82 that are electrically connected to the electrode assembly 88 and that protrude to the outside of the case 85, and a film cover 84 that seals the case 85.

The case 85 can include a mounting recess 86 that houses the electrode assembly 88, and a heat dissipating flange 87 that is extended to the outside from an upper end of the mounting recess 86. The mounting recess 86 can have an approximately quadrangular shape, and disposed at the center of the case 85.

The heat dissipating flange 87 may be formed along the circumference of the mounting recess 86, and a bent heat dissipating plate 89 may be formed at one side end of the heat dissipating flange 87.

The positive electrode terminal 81 may be electrically connected to a positive electrode 88a of the electrode assembly 88 to penetrate through a wall surface of the mounting recess 86 and to protrude to the outside, and the negative electrode terminal 82 may be electrically connected to a negative electrode 88b of the electrode assembly 88 to penetrate through a wall surface of the mounting recess 86 and to protrude to the outside. In this case, a gasket 83 for insulation may be installed between the case 85 and the terminals 81 and 82.

Figure 11:
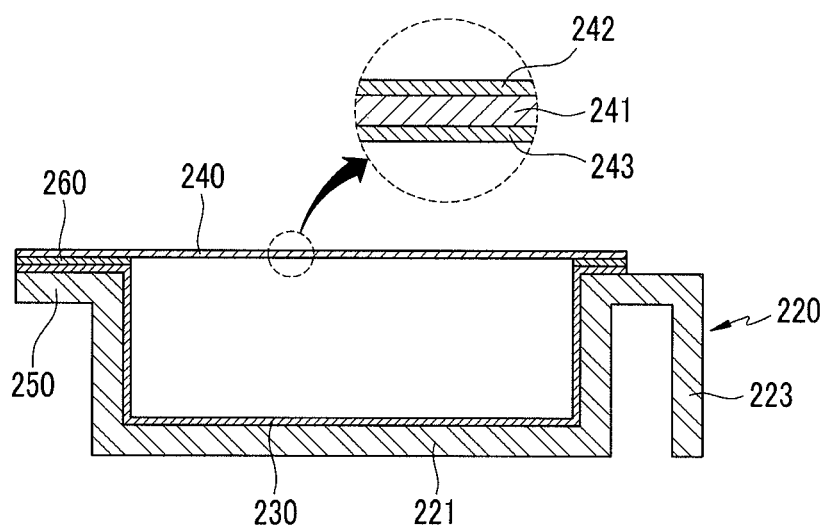
FIG. 11 is a cross-sectional view illustrating a case and a film cover of a rechargeable battery according to a sixth embodiment of the present invention.

FIG. 11 is a cross-sectional view illustrating a case and a film cover of a rechargeable battery according to a sixth embodiment of the present invention.

Referring to FIG. 11, a case 220 according to the present illustrated embodiment includes a mounting recess 221 that houses an electrode assembly and a heat dissipating flange 250 that is extended to the outside from an upper end of the mounting recess 221. The mounting recess 221 may have an approximately quadrangular shape and be disposed at the center of the case 220.

The heat dissipating flange 250 may be formed along a circumference of the mounting recess 221, and a bent heat dissipating plate 223 may be formed at one side end of the heat dissipating flange 250.

An insulation film 230 for insulation may be coated on an inner surface of the case 220. The insulation film 230 may be made of a polymer, as an example. Further, in the heat dissipating flange 250, an adhesive layer 260 may be formed in an upper surface of the heat dissipating flange 250 to which a film cover may be attached, and thus the film cover 240 can be stably attached to the heat dissipating flange 250.

The film cover 240 can include a metal foil 241 that is disposed at the center thereof, and polymer layers 242 and 243 that are disposed at both surfaces of the metal foil 241. Accordingly, because the polymer layers 242 and 243 and the adhesive layer 260 are bonded by thermo-compression, the film cover 240 can be stably fixed to the case 220, and the metal foil 241 can provide predetermined strength to the film cover 240.

Figure 12:
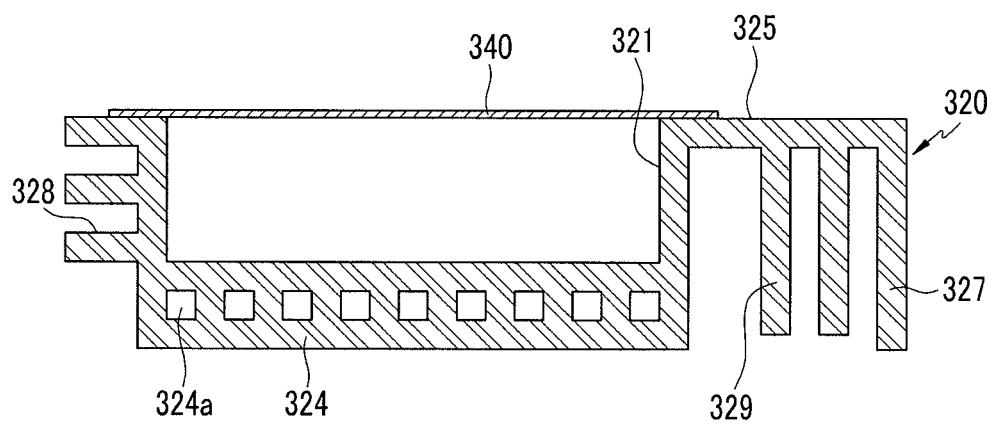
FIG. 12 is a cross-sectional view illustrating a case and a film cover of a rechargeable battery according to a seventh embodiment of the present invention.

FIG. 12 is a cross-sectional view illustrating a case and a film cover of a rechargeable battery according to a seventh embodiment of the present invention.

Referring to FIG. 12, a case 320 according to the present illustrated embodiment includes a mounting recess 321 that houses an electrode group, and a heat dissipating flange 325 that is extended to the outside from an upper end of the mounting recess 321. The mounting recess 321 may have approximately a quadrangular shape, and disposed at the center of the case 320. A film cover 340 that covers the mounting recess 321 may be installed in the case 320.

The heat dissipating flange 325 may be formed along a circumference of the mounting recess 321, and a bent heat dissipating plate 327 may be formed at one side end of the heat dissipating flange 325. A bottom cooling part 324 may be formed in the bottom of the mounting recess 321, and a cooling flow path 324a in which a coolant can move may be formed within the bottom cooling part 324. Further, a heat dissipating fin 328 protruded in parallel to the heat dissipating flange 325 may be formed in an external wall surface of the mounting recess 321.

A heat dissipating fin 329 protruded in parallel to the heat dissipating plate 327 may be formed in the heat dissipating flange 325 in which the heat dissipating plate 327 may be formed.

According to the present illustrated embodiment, the heat dissipating fins 328 and 329 and the cooling flow path 324a may be formed in the case 320 to easily discharge heat generated within the case 320.

Figure 13:
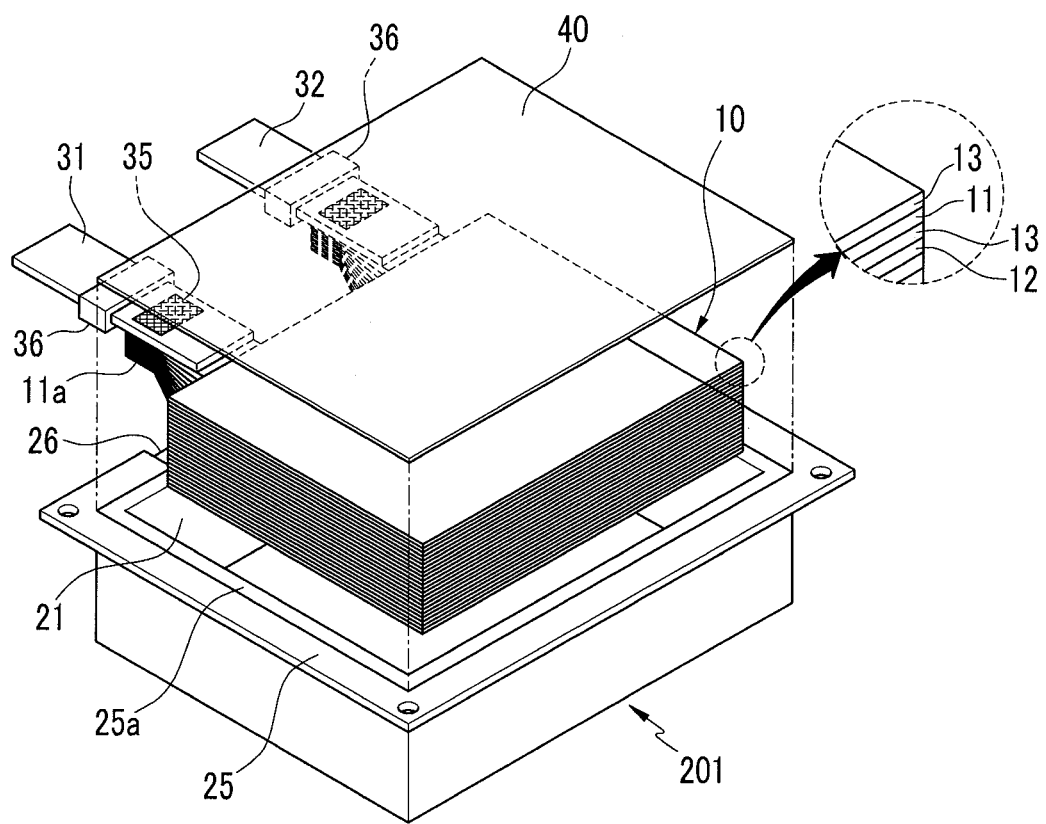
FIG. 13 is a perspective view illustrating a rechargeable battery according to the eighth embodiment of the present invention.

FIG. 13 is a perspective view illustrating a rechargeable battery according to the eighth embodiment of the present invention.

Referring to FIG. 13, a case 201 of a rechargeable battery according to the present illustrated embodiment does not include a heat dissipating plate (reference numeral 23 of FIG. 1). As such, the case 201 has a simple structure, thereby reducing the time and the cost for manufacturing the case 201.

In FIG. 13, the elements other than the case are the same as those of the first embodiment shown in FIG. 1. The present invention, however, is not limited thereto. Thus, the case not having the heat dissipating plate can be applied to the second to seventh embodiments.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode group that has at least one terminal;
a case that defines a recess that receives the electrode group wherein the case includes an opening that provides access to the recess;
a film cover that extends over the opening so as to secure the electrode group within the recess of the case; and
a heat dissipating member that extends outward from the case to dissipate heat from the recess containing the electrode group, wherein the film cover and the case defines a sealing portion adjacent the recess where the film cover covers the case, wherein the heat dissipating member extends outward from the sealing portion so as to define a member with two planar surfaces, wherein both of the planar surfaces are exposed to the air and are uncovered by the film cover and are integrally attached to the sealing portion; further wherein
the heat dissipating member comprises a heat dissipating flange that is integrally attached to the case adjacent the opening so as to extend outward from the case in a first direction and so as to define an outer end; and further wherein
the heat dissipating flange defines a terminal recess through which the at least one terminal of the electrode group extends.

2. The rechargeable battery of claim 1, wherein the electrode group comprises at least one positive electrode, at least one negative electrode, at least one separator interposed between the positive and negative electrodes, a positive electrode terminal electrically coupled to the at least one positive electrode, and a negative electrode terminal electrically coupled to the at least one negative electrode, wherein the positive electrode terminal and the negative electrode terminal extend outward from the recess.

3. The rechargeable battery of claim 2, wherein the opening has a plurality of lateral sides, wherein the positive electrode terminal and the negative electrode terminal extend outward from the opening on a first lateral side and wherein the positive electrode terminal and the negative electrode terminal are interposed between the film cover and the portion of the case adjacent the opening.

4. The rechargeable battery of claim 2, wherein the opening has a plurality of lateral sides, wherein the positive electrode terminal and the negative electrode terminal extend outward from the opening on a first lateral side and a second lateral side, respectively, and wherein the positive electrode terminal and the negative electrode terminal are interposed between the film cover and the portion of the case adjacent the opening.

5. The rechargeable battery of claim 2, wherein the opening has a plurality of lateral sides, wherein the positive electrode terminal extends outward from the opening on a first lateral side and is insulated from the case, and wherein the negative electrode is coupled to the case so that the case defines a negative electrode for the rechargeable battery.

6. The rechargeable battery of claim 1, further comprising an insulating member that is positioned inside the recess of the case so as to be interposed between the case and the electrode group.

7. The rechargeable battery of claim 1, further comprising at least one insulating member that is interposed between the at least one terminal and the case.

8. The rechargeable battery of claim 1, wherein the film cover adheres to the case with a sealing member.

9. The rechargeable battery of claim 1, wherein the film cover comprises a metal foil that is covered with a polymer layer on both sides of the metal foil.

10. The rechargeable battery of claim 1, further comprising at least one heat dissipating plate that is coupled to an outer end of the heat dissipating flange and extends in a second direction.

11. The rechargeable battery of claim 10, wherein the heat dissipating plate comprises an integral portion of the heat dissipating flange that is bent to extend in the second direction.

12. The rechargeable battery of claim 11, wherein the at least one heat dissipating plate includes a plurality of heat dissipating plates that are mounted to the flange so as to extend parallel to each other in the second direction.

13. The rechargeable battery of claim 1, wherein at least a portion of the case defines at least one coolant flow path therethrough that receives coolant.

14. The rechargeable battery of claim 1, wherein the heat dissipating member comprises at least one heat dissipating fin that extends outward from the casing, wherein the heat dissipating fin is positioned on the case so as to be spaced from the opening.

15. The rechargeable battery of claim 14, wherein the at least one heat dissipating fin comprises a plurality of heat dissipating fins that extend outward from the case so as to be substantially parallel to each other.

* * * * *